United States Patent Office 2,946,761
Patented July 26, 1960

2,946,761

AQUEOUS SOLUTION CONTAINING ACYRLONITRILE POLYMER AND A BISULFITE

Walter H. Schuller, Stamford, Conn., assignor to American Cyanamid Company, New York, N. Y., a corporation of Maine No Drawing. Filed Nov. 1, 1956, Ser. No. 619,685

8 Claims. (Cl. 260—29.6)

This invention relates to the stabilization of polymer solutions, and more particularly to the color stabilization of solutions containing a polymer of acrylonitrile. Still more particularly the invention is concerned with compositions comprising an aqueous solution of an acrylonitrile polymer that is free from basic groups, and from 0.1% to 5%, by weight of the said polymer on a net-dry basis, of a water-soluble inorganic bisulfite, e.g., an alkali-metal bisulfite.

Discoloration of solutions of a polymer of acrylonitrile, including homopolymeric acrylonitrile and acrylonitrile copolymers (thermoplastic acrylonitrile copolymers) that are free from basic groups, has long been a problem in the art of producing filamentary materials and other shaped articles, e.g., films and sheets, from such solutions. This is true with solutions made by dissolving the acrylonitrile polymer in various solvents, including solvents comprising a concentrated aqueous solution of a water-soluble salt that yields highly hydrated ions in aqueous solution. Because of this lack of color stability of such polymer solutions and the resulting tendency of the color bodies that form to be carried through into the product formed from such solutions, it has been necessary to utilize them, for instance in spinning filamentary material therefrom, in a relatively short period of time, e.g., within two or three days. The disadvantages of such relatively short storage life will be immediately apparent to those skilled in the art.

The present invention is based on my discovery that solutions of a polymer of acrylonitrile of the kind described in the preceding paragraphs can be stabilized against discoloration by incorporating therein a small but effective amount of a water-soluble inorganic bisulfite, more particularly an amount corresponding to from 0.1% to 5% by weight of the acrylonitrile polymer on a net-dry basis. The water-soluble inorganic bisulfite may be introduced into the solution as such, or in the form of the meta-bisulfite or as the hydrate. The percentage proportions mentioned above are on the basis of bisulfite as such. Illustrative examples of water-soluble inorganic bisulfites that can be used are the alkali-metal bisulfites, viz., sodium, potassium, lithium, caesium and rubidium; ammonium bisulfite; etc. The corresponding meta-bisulfites (anhydrous form of the bisulfite) or the hydrated forms of the bisulfites just mentioned can be used, as well as compounds which engender a bisulfite, e.g., a glyoxal-sodium bisulfite addition compound, a formaldehyde-sodium bisulfite addition compound, an acetone (or other ketone)-sodium bisulfite addition compound, etc.

The homopolymer of acrylonitrile or acrylonitrile copolymer that is free from basic groups can be dissolved in any suitable aqueous solvent, but I prefer to use a solvent comprising a concentrated aqueous solution of a water-soluble salt that yields highly hydrated ions in aqueous solution, e.g., the chlorides, bromides, iodides, thiocyanates, perchlorates and nitrates. (The use of concentrated aqueous solutions of such salts as solvents for polyacrylonitrile and other polyvinyl compounds is more fully described in Rein U.S. Patent No. 2,140,921 dated December 20, 1938.) More specific examples of such water-soluble inorganic salts are zinc chloride, calcium chloride, lithium bromide, cadmium bromide, cadmium iodide, sodium thiocyanate, potassium thiocyanate, calcium thiocyanate, zinc thiocyanate, aluminum perchlorate, calcium perchlorate, calcium nitrate, zinc nitrate, etc. Other examples of suitable solvents are concentrated aqueous solutions of guanidine thiocyanate, the mono-(lower alkyl)-substituted guanidine thiocyanates and the symmetrical and unsymmetrical di-(lower alkyl)-substituted guanidine thiocyanates. Preferably, a water-soluble salt is employed that imparts a minimum of color to the solution. The concentration of the aforesaid water-soluble salt in the water in all cases is sufficiently high so that the resulting solution will dissolve the acrylonitrile polymer. In most cases the concentration of such water-soluble salt is substantially above 40% (e.g., from 45%–50% to 55%–60%) of the total weight of the solution of said salt dissolved in water, the upper limit being a saturated solution of the salt in water.

Instead of dissolving the water-soluble salt in water alone it can be dissolved in a mixture of water and an alcohol, e.g., a saturated aliphatic monohydric alcohol and especially such monohydric alcohols that contain from 1 to 6 carbon atoms, inclusive. In such mixtures the ratio of the weight of water to the weight of the aliphatic liquid in the solvent mixture preferably lies in the range of from 2:1 to 1:4. More specific examples of suitable liquids containing an alcoholic hydroxyl group are methyl alcohol, ethyl alcohol, ethylene gylcol monoethyl ether, ethylene glycol monomethyl ether, diacetone alcohol and ethyl lactate. Such mixtures additionally may contain acetonitrile or acetone, or both, and/or other organic compounds, e.g., ethyl lactate. For additional information on solvent mixtures comprising water and an organic compound see, for instance, British Patents 714,530 and 718,997.

The concentration of the acrylonitrile polymer in the aqueous solvent depends, for example, upon the particular solvent and extrusion apparatus employed in making a filamentary material or other shaped article from the solution, the diameter of the fiber or other article to be extruded and the average molecular weight of the polymer. The concentration may range, for example, from about 5% to about 20% by weight of the composition, that is, by weight of the total amount of polymer, solvent for the polymer, and water-soluble inorganic bisulfite. In most cases the concentration of the polymer in the solvent will be within the range of from about 7% or 8% up to about 15% or 16% by weight of the solution. The viscosity of the solution, as determined by measuring the time in seconds for a Monel metal ball 1/8" in diameter to fall through 20 cm. of the solution at 61° C., may be, for instance, from 10 to 200 seconds.

The preferred acrylonitrile polymer that is used in producing the compositions of the present invention is a fiber-formable polymer of either homopolymeric acrylonitrile or an acrylonitrile copolymer that is free from basic groups. Such acrylonitrile polymers have an average molecular weight which renders them suitable for use in producing filamentary materials therefrom, for instance within the range of from about 30,000 to about 200,000, more particularly from about 40,000 to about 100,000, and still more particularly from about 60,000 to about 80,000. (The average molecular weight may be determined, for example, from a viscosity value of a dimethylformamide solution of the acrylonitrile polymer and calculations by means of the Staudinger equation: U.S. Patent No. 2,404,713.) Acrylonitrile polymers which yield a solution having a specific viscosity at 40° C. within the range of 2 to 10 when 1 gram of the polymer is dissolved in 100 ml. of 60% aqueous sodium thiocyanate have an average molecular weight which enables the polymer to be used as a fiber-formable material. Hence such polymers can be used in forming the compositions, specifically spinning solutions, of the present invention.

When the acrylonitrile polymer is a copolymer of acrylonitrile with another, different, monoethylenically unsaturated monomer that is free from basic groups, it is preferred that the copolymer have a preponderant proportion (more than 50%) by weight of acrylonitrile combined in the polymer molecule, and, more particularly, at least 70% by weight of combined acrylonitrile in the copolymer molecule. In most cases the polymer of acrylonitrile will contain at least 80% by weight of acrylonitrile combined in the polymer molecule; or, in the case of the homopolymer, 100% by weight of acrylonitrile combined in the polymer molecule.

Illustrative examples of non-basic monomers that can be copolymerized with acrylonitrile to form acrylonitrile copolymers for use in producing the compositions of the present invention are monoethylenically unsaturated compounds represented by the general formula I 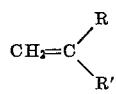

where R represents a member of the class consisting of hydrogen, halogen, and alkyl, cycloalkyl, aryl, alkaryl and aralkyl radicals, and R' represents a radical of the class consisting of aryl and alkaryl radicals and radicals represented by the formulas II 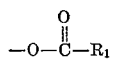

III 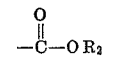

IV 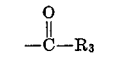

V 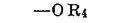

where $R_1$ and $R_2$ each represents a radical selected from the class consisting of alkyl, cycloalkyl, and alkoxy radicals, $R_3$ represents a radical selected from the class consisting of alkyl, cycloalkyl, alkoxyalkyl and aryl radicals, and $R_4$ has the same meaning as $R_1$ and $R_2$. Examples of compounds embraced by Formula I are the vinyl esters (e.g., vinyl acetate, vinyl propionate, vinyl butyrate, etc.), methyl vinyl ketone, ethyl vinyl ketone, methyl vinyl ether, ethyl vinyl ether, various esters of acrylic acid (e.g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art from Formula I and the definitions of R, R', $R_1$, $R_2$, $R_3$ and $R_4$ hereinbefore given. Other examples of non-basic monomers that can be copolymerized with acrylonitrile to produce acrylonitrile copolymers for use in practicing the present invention are acrylic acid, methacrylic acid, methacrylonitrile, acrylamide, and methacrylamide. Still other examples are those (not mentioned or embraced by the foregoing) that are given in, for example, Price U.S. Patent No. 2,727,021, dated December 13, 1955, column 7, lines 11–41 and wherein are disclosed numerous other examples of monoethylenically unsaturated monomers that are copolymerizable with acrylonitrile and are incapable of forming a salt with an acid.

Instead of using homopolymeric acrylonitrile alone or a copolymer of acrylonitrile alone, I may use a blend of homopolymeric acrylonitrile and a copolymer of acrylonitrile that is free from basic groups, or I may use a blend of different acrylonitrile copolymers. In such blends the proportions of the different acrylonitrile polymers may be varied as desired or as conditions may require, but in general it is preferable that the blend have an overall acrylonitrile polymer content of more than 50% by weight of the blend and advantageously at least 70% by weight of the blend. Good results are obtained in producing compositions containing a mixture of different acrylonitrile polymers when the overall acrylonitrile polymer content of the composition is at least 80% by weight thereof. The terms "polymer of acrylonitrile," "acrylonitrile polymer" and "acrylonitrile copolymer," as used herein and/or in the appended claims, are intended to include within their meaning both a single polymer and blends of different polymers wherein a substantial proportion, generally a major proportion (e.g., at least 70%), by weight of acrylonitrile in polymeric state, is present therein.

Any suitable method can be used in producing the compositions of the present invention. The solution of the polymer in the aqueous solvent may first be formed and the water-soluble inorganic bisulfite then added thereto; or the bisulfite may be added to the aqueous solution or dispersion prior to the addition of the acrylonitrile polymer; or the bisulfite may be incorporated into the composition simultaneously with the dissolution of the acrylonitrile polymer in the aqueous solvent. In the preferred compositions of the invention the solution is adjusted to a pH value within the range of from 4.0 to 8.0, and preferably to a pH ranging between 6 and 7.5, if it is not within the aforesaid range upon completion of the formulation.

The method of dissolving the acrylonitrile polymer in the solvent comprising a water-soluble salt which yields highly hydrated ions in an aqueous solution may be that which is disclosed and claimed in Cresswell U.S. Patent No. 2,605,246, dated July 29, 1952. When this method is followed the same variations described above, as to the stage at which the water-soluble inorganic bisulfite is added, can be made.

Heretofore it has been common practice to store spinning solutions comprising an acrylonitrile polymer dissolved in a concentrated aqueous solution of, for instance, sodium thiocyanate under an atmosphere of nitrogen and to use it within a few hours after preparation; otherwise it rapidly discolors, and this discoloration is carried through the spinning operation to give a fiber of poor color. By incorporating a water-soluble inorganic bisulfite into the solution, in accordance with this invention, it has been found that the solution can be stored in the presence of air for months without visible discoloration. Thus, a standard polyacrylonitrile spinning dope (without the stabilizer used in this invention), at a pH of 6.2, darkened in air to a yellow-brown color in 48 hours, and the same dope at a pH of 4.5 similarly darkened at a somewhat slower rate. In marked contrast the same dope to which had been added 1%, by weight of the polymer, or 0.1% by weight of the dope, remained almost water-white for more than 4 months in contact with air. This is a matter of considerable practical importance in commercial plant operations, since it permits storage of a spinning solution comprising an acrylonitrile polymer for a prolonged period before use and without the danger of producing off-color fiber due to discoloration of the spinning solution during storage.

In order that those skilled in the art better may understand how the present invention may be carried into effect, the following examples are given by way of illustration and not by way of limitation. All parts and percentages are by weight.

*Example 1*

A spinning solution (A) is prepared by first mixing 24 parts of a 57.3% aqueous solution of calcium thiocyanate with 2.5 parts of water and adjusting the pH of the resulting solution to 6.5. Two (2) parts of dry, finely divided copolymer (produced by polymerization of a mixture of 95 parts of acrylonitrile and 5 parts of ethyl acrylate) and 0.06 part of sodium bisulfite are thoroughly mixed into the aqueous calcium thiocyanate solution while maintaining the temperature of the latter at −9° C. (One (1) gram of the dry acrylonitrile-ethyl acrylate copolymer, dissolved in a 60% aqueous sodium thiocyanate solution to make 100 ml. at 20° C. has a viscosity at 40° C. of 30.7 centipoises.) Mixing is continued for 30 hours while keeping the solution at a temperature of 40°–45° C. The viscosity of the resulting solution, as determined by measuring the time for a Monel metal ball, 1/8″ in diameter and weighing 0.142 gram, to fall through 20 cm. of the solution maintained at 61° C., is 86.3 seconds.

Another spinning solution (B) is prepared in exactly the same manner described above with the exception that the sodium bisulfite is not added. Samples of both solutions are placed in containers (from which air is not excluded) and allowed to stand at room temperature (20° to 30° C.), with periodic visual examination. Solution A containing the color stabilizer (sodium bisulfite) shows no visual evidence of discoloration after standing for 7 weeks, while solution B is visibly discolored after standing for between 3 and 4 days.

Example 2

A copolymer is prepared by polymerizing a mixture of 90% acrylonitrile and 10% acrylamide by known methods. This copolymer, when dissolved in 60% aqueous sodium thiocyanate to make 1 gram per 100 ml. at 20° C., has a viscosity of 23.7 centipoises at 40° C. A spinning solution (A) is produced by dissolving 14 parts of the dry, powdered acrylonitrile-acrylamide copolymer and 0.07 part of potassium bisulfite in 186 parts of a 48% aqueous solution of calcium thiocyanate, the mixture being stirred until a homogeneous solution is obtained. The viscosity of the resulting solution is 23.2 seconds at 61° C., as measured by the time required for a 1/8″ diameter Monel ball to fall 20 cm. through the solution.

Another spinning solution (B) is prepared in exactly the same manner described above with the exception that the potassium bisulfite is not added. Samples of both solutions are placed in containers (from which air is not excluded) and allowed to stand at room temperature, being visually examined from time to time. Solution A containing the potassium bisulfite stabilizer shows no visual evidence of discoloration after standing for 38 days, while solution B is visibly discolored after standing for about 40 hours.

Example 3

Same as in Example 2 with the exception that, instead of the acrylonitrile-acrylamide copolymer of that example, there is used 14 parts of homopolymeric acrylonitrile having an average molecular weight of about 80,000 as calculated by means of the Staudinger equation from the viscosity of a solution of the polyacrylonitrile in dimethylformamide; and, instead of 0.07 part of potassium bisulfite, there is used 0.042 part of sodium meta-bisulfite.

A sample of the solution (A) is tested for its color stability in comparison with a sample of another solution (B), the latter being a "control" solution that is prepared in exactly the same manner as solution A with the exception that the 0.042 part of sodium meta-bisulfite has been omitted. Solution A shows no visual evidence of discoloration after standing for 9 weeks while solution B is appreciably discolored in from 4 to 6 days.

Example 4

Twenty-seven and eight-tenth (27.8) parts of homopolymeric acrylonitrile is dissolved, with stirring, in 200 parts of a 75% aqueous solution of zinc chloride for 90 minutes at 85°–90° C. (A sample of this homopolymer, when dissolved in 60% aqueous sodium thiocyanate solution to have a concentration of 1 gram per 100 ml. of solution at 20° C., gives a solution having a viscosity of 18.5 centipoises at 40° C.) To the solution of the homopolymeric acrylonitrile is added dropwise with stirring, over a period of 90 minutes, 50 parts of water containing 1 part of sodium bisulfite, the solution temperature being gradually reduced to 75° C. This solution (A) is later used in casting films as subsequently will be described.

Another solution (B) is prepared in exactly the same manner with the exception that the sodium bisulfite is omitted. Both solutions are allowed to stand undisturbed and are periodically examined as in the preceding examples. Solution A shows no appreciable evidence of discoloration after standing for more than 1 week, while the color of solution B, after less than 48 hours, is poorer than its original color, and continues to get worse upon longer standing.

Films are cast from both solutions at the end of a week. The solutions are cast on glass plates, as a 0.004″ thick layer, by using a doctor blade. The polymer (approximately 10% by weight of the solution) is then precipitated as a film on the individual plates by immersion of the plates in water (maintained at +0.5° C.) to which sufficient hydrochloric acid has been added to make it 0.25 N. (This dilute acid prevents the precipitation of basic zinc chloride when the solution is used as a coagulating bath.)

The plates containing the precipitated films are removed from the cold-water bath, air-dried first at room temperature and then in a 110° F. oven to constant weight. The dried film that was cast from solution A (containing the color stabilizer) is materially lighter in color, upon visual examination, than that cast from solution B.

Example 5

In forming the spinning solution (A) of this example, 194 parts of a granulated, wet, copolymer cake consisting of 27.7% of water and 72.3% of an acrylonitrile copolymer obtained by copolymerization of 95% acrylonitrile and 5% methyl acrylate is dispersed with rapid stirring into 641 parts of a 43.5% aqueous solution of calcium thiocyanate at about 25° C. (The average molecular weight of the copolymer as determined from viscosity measurements of a dimethylformamide solution, using the Staudinger equation as described, for example, in U.S. Patent No. 2,404,714, is 77,000.) A homogeneous, thin slurry results. While contining to stir rapidly, 1165 parts of a 55.9% aqueous solution of calcium thiocyanate is added to the slurry described above concurrently with the addition of 1.4 parts of calcium bisulfite. The viscosity soon increases, and the stirring is reduced to a low speed. After stirring for 2 hours at a low speed and at a temperature of about 20° C., solution of the copolymer appears to be complete.

Another spinning solution (B) is prepared in exactly the same manner described above with the exception that the calcium bisulfite is not added. Samples of both solutions are stored and examined from time to time as described in the preceding examples. Solution A containing the calcium bisulfite shows no visual evidence of discoloration after standing for 51 days while solution B is appreciably discolored when examined after standing for only 5 days.

Example 6

One hundred and ninety-four (194) parts of the same granulated, wet, acrylonitrile-methyl acrylate copolymer cake used in Example 5 is dispersed with rapid stirring in 1196 parts of a 50% aqueous solution of guanidine thiocyanate at about 25° C. A thin, homogeneous slurry results, the largest particles of the copolymer being about the size of a pinhead. While continuing to stir rapidly, 610 parts of guanidine thiocyanate and 0.7 part of sodium meta-bisulfite are added to the slurry, and the mixture is heated to 40° C. A thin, clear, air-free solution results when the mixture reaches this temperature. After further stirring at 40° C., the viscosity of this spinning solution (A) increases to the consistency of molasses.

Another spinning solution (B) is prepared in exactly the same manner described above with the exception that the sodium meta-bisulfite is omitted. Samples of both solutions are stored and examined from time to time as described in the preceding examples. Solution A containing the stabilizer (introduced initially in the form of sodium meta-bisulfite) shows no visual evidence of discoloration after standing for 18 days while solution B is noticeably darker than its original color after standing for only about 30 hours.

*Example 7*

One hundred and ninety-four (194) parts of the same granulated, wet, acrylonitrile-methyl acrylate copolymer cake used in Example 5 is dispersed with rapid stirring in 1010 parts of a 30% aqueous solution of zinc chloride at about 25° C. In this case, too, a homogeneous, thin slurry results. While continuing to stir rapidly, 796 parts of zinc chloride and 2.8 parts of an addition compound of formaldehyde and sodium bisulfite in a 1 to 1 molar ratio are added to the above-described slurry. The viscosity soon increases, and the stirring is reduced to a low speed. After agitating by stirring for 1 hour at a low speed, solution of the copolymer appears to be complete and stirring, therefore, is stopped. This spinning solution is identified hereinafter as solution A.

Another spinning solution (B) is prepared in exactly the same manner described above with the exception that the formaldehyde-sodium bisulfite addition compound is omitted. Samples of both solutions are stored and examined from time to time as in the preceding examples. Solution A containing the color stabilizer shows no visual evidence of discoloration after standing for 26 days while solution B is appreciably darker than its original color after standing for only about 40 hours.

*Example 8*

An acrylonitrile-allyl alcohol copolymer containing about 2.8% of combined allyl alcohol, and 0.1% of sodium meta-bisulfite, based on the weight of the copolymer, are dissolved in 48% aqueous calcium thiocyanate solution to form a spinning solution (A) containing about 7% of the said copolymer. The viscosity of the resulting spinning solution is 22.7 seconds at 61° C. as measured by the time required for a ⅛″ diameter Monel ball to fall 20 cm. through the solution.

Another spinning solution (B) is prepared in exactly the same manner described above with the exception that the sodium meta-bisulfite is omitted. Both solutions are stored and periodically examined in the same manner described in preceding examples. Solution A containing the color stabilizer is not noticeably discolored after standing for over a week while solution B is darker than its original color after standing for only about 2 days.

Increasing the amount of stabilizer up to 5%, by weight of the net-dry copolymer, increases the resistance of the spinning solution of this example (as well as others hereinbefore given) against discoloration on standing. Amounts above 5% of stabilizer can be used if desired, but no particular advantages appear to accrue therefrom.

*Example 9*

In producing the spinning solution (A) of this example an aqueous solution of sodium thiocyanate, more particularly 7.57 kg. of a 57.7% aqueous solution of sodium thiocyanate, and enough water (3.35 kg.) to make a 40% solution, which is a concentration insufficient to dissolve the acrylonitrile polymerization product, are charged into a mixing kettle equipped with high-speed agitation. The solution is agitated and a vacuum of 29 inches of mercury is applied for 6 minutes, after which the agitation is stopped. Twelve (12) minutes later the vacuum is released and 6.45 kg. of a moist crumb (66.2% solids) of an acrylonitrile-vinyl acetate copolymer, obtained by polymerization of a mixture of 95% acrylonitrile and 5% vinyl acetate, is added without agitation. Vacuum is reapplied and after 9 minutes the high-speed agitation is started. After 3 minutes, 27.63 kg. of a 57.7% aqueous solution of sodium thiocyanate and 42.7 grams of sodium bisulfite are added over a period of at least 3 minutes while the batch is being agitated under vacuum. The speed of agitation is reduced in 10 minutes, and agitation is then continued until all of the copolymer has dissolved, which usually takes place in about 1 hour or a little less.

Another spinning solution (B) is prepared in exactly the same manner described above with the exception that the sodium bisulfite is omitted. Both solutions are stored and periodically examined in the same manner described in preceding examples. Solution A containing the sodium bisulfite is not noticeably discolored after standing for more than 2 months, while solution B is visibly discolored after standing for between 2 and 3 days.

Individual portions of solutions A and B are adjusted to a pH of 4.5 with acetic acid (glacial), filtered and deaerated under vacuum. The deaerated spinning solution, in each case, is heated to about 70° C. prior to extrusion through a 45-hole spinnerette having openings 75 microns in diameter into a coagulating bath comprising a 10% aqueous solution of sodium thiocyanate and maintained at about 0° C. After water-washing and stretching operations, the multifilament yarn is continuously dried on converging drying rolls, and is then thermally retracted 15% by passage through a heat-treating furnace in a relaxed, free-to-shink state. The production speed is 100 meters per minute. The dried multifilament thread made from solution A is lighter in color than that made from solution B.

Fibers similarly wet spun from the solutions of the other examples (adjusted during or after formulation and prior to spinning to a pH usually within the range of 4.3 to 6.5 with acetic or other acid), using either cold water alone as the coagulating bath or a coagulating bath comprising about 10% of the same salt used in making the spinning solution, show either a marked improvement in color or have as good a color, when made from aged solutions A (containing the stabilizer) as those made from freshly prepared solutions B (containing no stabilizer).

I claim:

1. A fiber-formable, fluid composition comprising an aqueous solution having dissolved therein an acrylonitrile polymer selected from the class consisting of homopolymers of acrylonitrile and copolymers of acrylonitrile having combined in the polymer molecule a preponderant proportion by weight of acrylonitrile and a minor proportion by weight of a monoethylenically unsaturated monomer that is copolymerizable with acrylonitrile and is incapable of forming a salt with an acid, said polymer constituting from about 5% to about 20% by weight of the said composition; and, to improve the color stability on aging of the said aqueous solution, from 0.1% to 5%, by weight of the said polymer on a net-dry basis, of a water-soluble inorganic bisulfite.

2. A fiber-formable, fluid composition comprising an aqueous solution of an acrylonitrile polymer selected from the class consisting of homopolymers of acrylonitrile and copolymers of acrylonitrile having combined in the polymer molecule not less than 70% by weight of acrylonitrile and not more than 30% by weight of a monoethylenically unsaturated monomer that is copolymerizable with acrylonitrile and is incapable of forming a salt with an acid, said polymer being dissolved in a solvent comprising a concentrated aqueous solution of a water-soluble salt that yields highly hydrated ions in aqueous solution and constituting from about 5% to about 20% by weight of the said composition; and, to improve the color stability on aging of the said aqueous solution, from 0.1% to 5%, by weight of the said polymer on a net-dry basis, of a water-soluble inorganic bisulfite.

3. A fiber-formable, fluid composition as in claim 2 wherein the polymer of acrylonitrile constitutes from about 7% to about 16% by weight of the composition.

4. A fiber-formable, fluid composition comprising an acrylonitrile polymer selected from the class consisting of homopolymers of acrylonitrile and copolymers of acrylonitrile having combined in the polymer molecule not less than 80% by weight of acrylonitrile and not more than 20% by weight of a monoethylenically unsaturated monomer that is copolymerizable with acrylonitrile and is incapable of forming a salt with an acid, said polymer being dissolved in a concentrated aqueous solution of a water-soluble thiocyanate and constituting from about 7% to about 16% by weight of the said composition; and, to improve the color stability on aging of the said composition, from 0.1% to 5%, by weight of the said polymer on a net-dry basis, of an alkali-metal bisulfite.

5. A fiber-formable, fluid composition as in claim 4 wherein the water-soluble thiocyanate is sodium thiocyanate.

6. A fiber-formable, fluid composition as in claim 4 wherein the alkali-metal bisulfite is sodium bisulfite.

7. A fiber-formable, fluid composition as in claim 4 wherein the water-soluble thiocyanate is sodium thiocyanate and the alkali-metal bisulfite is sodium bisulfite.

8. A fiber-formable, fluid composition as in claim 4 which is within the pH range of from 4.0 to 8.0.

References Cited in the file of this patent

UNITED STATES PATENTS

| | | |
|---|---|---|
| 1,912,345 | De Plaine | May 30, 1933 |
| 2,404,728 | Finzel | July 23, 1946 |
| 2,432,448 | Richards | Dec. 9, 1947 |
| 2,502,030 | Scheiderbauer | Mar. 28, 1950 |
| 2,587,465 | Ham et al. | Feb. 26, 1952 |
| 2,644,803 | Cresswell | July 7, 1953 |
| 2,648,648 | Stanton et al. | Aug. 11, 1953 |
| 2,661,305 | Appleton et al. | Dec. 1, 1953 |
| 2,710,846 | Dietrich et al. | June 14, 1955 |
| 2,751,374 | Cresswell | June 19, 1956 |
| 2,774,648 | Mecco et al. | Dec. 18, 1956 |
| 2,837,492 | Stanton et al. | June 3, 1958 |

OTHER REFERENCES

Partington: "A Text-Book of Inorganic Chemistry," page 467, 6th edition, Macmillan & Co., London (1953).